United States Patent
Helander et al.

(10) Patent No.: US 6,735,187 B1
(45) Date of Patent: May 11, 2004

(54) ARRANGEMENT AND METHOD RELATING TO PACKET DATA COMMUNICATION AND A PACKET DATA COMMUNICATION SYSTEM

(75) Inventors: Lars-Erik Helander, Träslövsläge (SE); Sten Pettersson, Torslanda (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/502,756

(22) Filed: Feb. 11, 2000

(30) Foreign Application Priority Data

Feb. 11, 1999 (SE) .............................. 9900461

(51) Int. Cl.[7] .......................... H04M 3/42; H04Q 7/24; H04J 3/16
(52) U.S. Cl. .................. 370/338; 370/328; 370/468; 455/414; 455/436
(58) Field of Search .................. 370/338, 347, 370/337, 328, 321, 310.2, 358, 468, 351, 352, 389, 395, 400, 401, 402, 465, 341, 349, 428, 452, 560; 455/426, 414, 436, 560, 561

(56) References Cited

U.S. PATENT DOCUMENTS

| | | | |
|---|---|---|---|
| 5,771,353 A | | 6/1998 | Eggleston et al. |
| 5,956,331 A | * | 9/1999 | Rautiola et al. |
| 6,137,783 A | * | 10/2000 | Sallberg |
| 6,230,005 B1 | * | 5/2001 | Le et al. ............... 455/414.1 |
| 6,377,804 B1 | * | 4/2002 | Lintulampi |
| 6,385,451 B1 | * | 5/2002 | Kalliokulju et al. |
| 6,396,828 B1 | * | 5/2002 | Liu |
| 6,434,133 B1 | * | 8/2002 | Hamalainen |
| 6,438,370 B1 | * | 8/2002 | Einola et al. |
| 6,466,556 B1 | * | 10/2002 | Boudreaux |
| 6,469,998 B1 | * | 10/2002 | Burgaleta Salinas et al. .... 370/338 |
| 6,477,151 B1 | * | 11/2002 | Oksala |
| 6,487,406 B1 | * | 11/2002 | Chang et al. |

FOREIGN PATENT DOCUMENTS

| | | |
|---|---|---|
| CA | 2 216 533 | 6/1997 |
| EP | 0 821 507 | 1/1997 |
| WO | 97/02670 | 1/1997 |
| WO | 97/22936 | 6/1997 |
| WO | 98/17048 | 4/1998 |
| WO | 98/58517 | 12/1998 |

OTHER PUBLICATIONS

GSM 09.60, version 5.0.0, Draft TS 100 960 v. 5.0.0 (Jan. 1998) by European Telecommunications Standards Institute.
GSM 3.60 version 5.2.0 (Dec. 1997) by European Telecommunication Standards Institute.

* cited by examiner

*Primary Examiner*—Chi Pham
*Assistant Examiner*—Afsar M. Qureshi (57) ABSTRACT

An end user local network and a packet data communication network are interconnected by an arrangement including a packet data network backbone, at least one packet data node with a serving functionality for handling packet data communication, and a gateway functionality for providing communication with external network(s). At least one virtual distributed node provides a gateway functionality and includes an interworking node device including a converting device for converting between a local network and user communication protocol including a user level data packet format (ULC) and an internal packet data communication protocol using an internal packet data format (ICP). The virtual distributed node includes a management functionality (MA) for managing the interworking node device. The management functionality is executed in a packet data node, and the packet data network backbone is used for communication.

8 Claims, 4 Drawing Sheets

ARRANGEMENT AND METHOD RELATING TO PACKET DATA COMMUNICATION AND A PACKET DATA COMMUNICATION SYSTEM

This application claims priority under 35 U.S.C. §§ 119 and/or 365 to 9900461-6 filed in Sweden on Feb. 11, 1999; the entire content of which is hereby incorporated by reference.

BACKGROUND

The present invention relates an arrangement, and a method, in a packet data communication system of connecting an end user local network and a packet data communication network. Particularly the invention relates to a network structure in a packet data communication system. The invention further relates to a packet data communication system including such arrangement(s) or a packet data communication system with a network structure for interconnecting local networks and a packet data communication network.

Cellular communication systems which, in addition to support communication of speech and a circuit switched data, also support communication of packet data are receiving more and more attention and several such systems are known. The GSM (Global System for Mobile Communication) system supports communication of packet data through the General Packet Radio Service (GPRS). Also the PDC-system (Personal Digital Communications) provides for packet data communication support through the PPDC (Packet PDC). Another such packet data communication service which is intended for the AMPS system is CDPD.

The GPRS of GSM uses a packet mode technique both for transfer of data and signalling and GPRS radio channels are defined which can be flexibly allocated. Time slots in a TDMA (Time Division Multiple Access) frame are shared by the users that are active and uplink and downlink are allocated separately. In GPRS as well as in other packet data communication supporting systems nodes are introduced for the management of packet data communication and in the present application such nodes are called packet data nodes. In GPRS the packet data node is called the serving GPRS support node (SGSN) which is at the same hierarchical level as an ordinary MSC (Mobile Switching Center) and it keeps track of the locations of individual mobile subscriber stations, performs security functions and access control. The SGSN is connected to the base station system (BSS) with frame relay. Another node is also provided in GPRS, the so called gateway GSN (GGSN) which provides for interworking with external packet switched networks and it is connected with SGSN via an IP-based GPRS backbone network.

For interconnecting a packet data communication network and for example a local area network of an end user expensive and complicated solutions are needed. Particularly specific routing equipment the only purpose of which is to connect an end user LAN with a packet data supporting network such as GPRS is needed. Such a router has to be supplied either by the end user himself or, as is mostly the case, by the GPRS operator. This is an expensive solution for the operator and furthermore it does not provide for any efficient scalability. According to the known solution a router is supplied for example by the operator and there has to be a link to the user from the GPRS system on which a tunnel protocol must run in order to enable the use of end user private IP addressing towards a mobile station. If Internet access is wanted, there has to be a link from GPRS to an Internet Service Provider and another router from Internet towards the end user communicating with a further router as referred to above providing a link to Internet from the end user. From SGSN and to GGSN, as defined above, there is a physical link via the GPRS backbone and a GTP (GPRS tunnelling protocol e.g. described in GSM 09.60 Vers. 5.0.0, Draft TS 100, 960 Vers. 5.0.0 (1998–01) by ETSI (European Telecommunications Standard Institute)) link is used from SGSN to GGSN. The solution is centralised and it requires extra tunnelling to the LAN of the end users, thus a tunnel runs from a GGSN to a tunnel device, the tunnel end point of which has to be reachable through use of public IP addressing or by use of GPRS operator supplied addressing. This is a requirement since otherwise the tunnel end point can not be reached from the GGSN. If routing is provided through Internet, encryption requirements may be imposed. The tunnel ends with a tunnel end point device which may be end user supplied or operator supplied and it runs an unspecified tunnel protocol which may include encryption. This is managed by the end user in turn communicating with the end user equipment which in turn communicates with the mobile station.

The known centralised solution is even more disadvantageous if the end users use private IP addressing schemes. In addition to the high costs of equipment for the operator, a lot of physical space is needed which in turn also is expensive and unpractical for the operator. Still further, since the equipment is centralised, the impact will be very large in case of functional disturbances. It is also a drawback that the operator is dependent on routing equipment which involves high costs.

SUMMARY

What is needed is therefore an arrangement for interconnecting an end user local network and a packet data communication network which facilitates the provision of interconnection for the operator and through which a simple and cheap solution can be provided for the operator. Still further an arrangement is needed which enables a high degree of scalability of the system. Still further an arrangement is needed which does not require the operator to buy and pay for expensive and space demanding equipment which often only can be used for the particular dedicated purposes. Still further an arrangement is needed which removes the drawbacks of the hitherto known solutions which are centralised leading to severe impacts in the case of functional disturbances etc. Particularly an arrangement is needed through which the buying of dedicated equipment can be avoided to a high degree for the operator. An arrangement is also needed through which the structure is simplified also when end users use private IP addressing schemes.

Particularly an arrangement is needed through which the costs for the total system can be reduced and which enables a simple solution solving end user IP address overlapping in case IP addressing schemes are used. Particularly an arrangement is needed through which the costs can be reduced for the operator and in practice also for the customers since they will pay for what they actually use.

A cellular communication system supporting packet data communication having a network structure allowing an interconnection of the packet data network and end user networks fulfilling the aims as discussed above is also needed.

Still further a method of interconnecting a packet data communication network and an end user local network fulfilling the above discussed objects is also needed.

Therefore an arrangement for interconnecting an end user local network and a packet data communication network comprising a packet data network backbone, is provided, at least comprising one packet data node with a serving functionality for handling packet data communication, the arrangement further including a gateway functionality for providing communication with external networks. It comprises at least one virtual distributed node which provides the gateway functionality. The virtual distributed node comprises an interworking node device including converting means for converting between a communication protocol for local network end user communication which uses a user level data packet format and an internal packet data protocol using an internal packet data format. The virtual distributed node includes a management functionality for managing the interworking node device. This management functionality is executed in, or localized to, a packet data node with a serving functionality and the packet data network is used for communication. Thus the gateway functionality is moved to the interworking node device which generally is provided by the user and the management thereof is provided through the serving packet data node. The management functionality particularly comprises a management system which executes in a serving packet data node. The management functionality can be provided and executed in a number of serving packet data nodes and a plurality of serving packet data nodes may also be able to manage a plurality of interworking node devices for reasons of redundancy. In a most advantageous embodiment the virtual distributed node/nodes is/are managed by the operator of the packet data communication system. The management can of course also be handled in other manners, but operator management provides for a particularly advantageous implementation.

A public or third party data communication network such as for example Internet may also be integrated with the packet data communication system backbone network as an interconnect or as an interconnecting data network.

According to different embodiments the internal packet data frames may be, or require being, encrypted. In that case the interworking node device has to convert the internal packet data frames to/from user level packet data frames, thus also handling the encryption. Encryption is particularly needed if a part of the network is a public or third party data communication network such as Internet. The encrypted frames may be so called IP-sec-frames. This is particularly the case when an end user uses a private IP addressing scheme, the external network being Internet. The same is of course applicable in case the public or third party data communication network is some other network than Internet or an intranet.

The inventive concept can be implemented for different cellular communication systems including a packet data communication supporting functionality such as for example GPRS. In that case the packet data node with a serving functionality is the so called serving GPRS support node SGSN. This node is connected to a base station subsystem BSS and the internal packet data communication protocol that is used is the GTP protocol. The virtual distributed node providing the gateway functionality can thus be said to replace the network gateway node GSN, also called GGSN. According to the present invention the virtual distributed node including the interworking node device, which is managed from a SGSN, thus replaces the conventional GGSN, the management of the entire system still, in an advantageous implementation, being handled by the operator, the interworking node device, however, physically and financially being taken over by the end user.

In an alternative embodiment the packet data communication system is packet PDC, PPDC, in which case the serving packet data node is a packet-mobile switching center, P-MSC. In still another implementation the concerned system is the CDPD as discussed above. Of course the invention is also applicable to any other packet data system using a network structure which is similar to what has been described above, including serving and gateway node types, such as for example the GPRS structure.

The inventive concept can e.g. also be implemented in UMTS (Universal Mobile Telephone System). In an alternative implementation the virtual distributed node or nodes is/are managed by the end user.

Therefore also a cellular communication system supporting packet data communication which comprises a number of packet data nodes with a serving functionality for handling packet data communication, communicating with the base station subsystem, and including a gateway functionality for providing communication with external data networks is provided. The system also provides for communication with end user local networks. The communication system comprises a number of virtual distributed nodes providing a gateway functionality and comprising an interworking node device which includes converting means for converting between a communication protocol for local network end user traffic, which protocol uses a user level data packet format, and an internal packet data protocol using an internal packet format. Each virtual distributed node is also provided with a management functionality for managing the interworking node device. Said management functionality for a number of interworking node devices, i.e. one or more, is executed in a number of packet data nodes comprising a serving functionality. The packet data network backbone is used for communication. According to different embodiments the management functionality is provided in a plurality of serving packet data nodes for managing at least one interworking node device, i.e. a plurality of serving packet data nodes may all be able to manage one interworking node device for redundancy reasons or one serving packet data node may be able to manage one or more interworking node devices or a plurality of interworking node devices as well as one interworking node device either may be manageable from one packet data node with a serving functionality or by a plurality of packet data nodes with a serving functionality. The solution may be the same throughout the system or different solutions may be implemented over the system, for example taking into consideration the redundancy needed at the actual location.

Advantageously the virtual distributed nodes are managed by the operator of the cellular communication system supporting packet data communication. In a particular implementation a public or third party data communication network is integrated with the cellular communication system supporting packet data communication the backbone network acting as an interconnecting data network. The public or third party data communication network may for example be Internet. Intranets may also be integrated in a similar manner.

In a particular implementation a number of internal packet data frames provided to a number of interworking node devices for conversion are encrypted, e.g. because of an external data communication network being connected. The interworking node device does then convert said internal packet data frames to (and from) user level packet data frames for end user communication. Systems implementing the inventive concept may for example be GPRS, PPDC, CDPD, UMTS etc., the main thing being that the structure is such that it needs nodes with a serving functionality and a gateway functionality.

A method of interconnecting an end user local network and a packet data communication network comprising a packet data network backbone is therefore also provided. The packet data communication network comprises a number of packet data nodes including a serving functionality and it also includes a gateway functionality for external communication. The method includes the steps of; introducing an interworking node device to provide a gateway functionality; executing the management of said interworking node device in a number of packet data nodes having a serving functionality; using an internal data communication protocol for communication between a packet data node with a serving functionality and an interworking node device; using a communication protocol for communication between the interworking node device and the end user of a local network, e.g. a Local Area Network (LAN), in said interworking node device converting between the end user communication protocol and the internal data communication protocol so that communication between a packet data node with a serving functionality and an end user local network can take place without the use of specific tunnelling protocols and intermediate, centralised, routing means.

Particularly the method includes the step of managing an interworking node device from a plurality of packet data nodes for reasons of redundancy. Even more particularly the method includes the step of managing a plurality of interworking node devices from one and the same packet data node with a serving functionality. Most particularly the method includes the step of providing for managing of the interworking node devices, or the virtual gateway nodes, by the operator of the packet data communication system. In an advantageous implementation the method includes the steps of integrating a public or third party data communication network, such as for example Internet, or intranets, as interconnecting external networks. The method can be implemented in different packet data communication systems such as GPRS, PPDC or CDPD etc. as referred to above.

It is an advantage of the invention that a decentralised solution is used, thus reducing the consequences of malfunctions etc. It is also an advantage of the invention that the equipment can be customized and provided by the customer, on the customer premises and also physically located at the end user's desired location and still it particularly may be handled or managed by the operator of the packet data system. Also a number of other advantages are provided for of which a number already have been described earlier in the application.

BRIEF DESCRIPTION OF THE DRAWINGS

The invention will in the following be further described in non-limiting way and with reference to the accompanying drawings in which.

DETAILED DESCRIPTION

Figure 1:
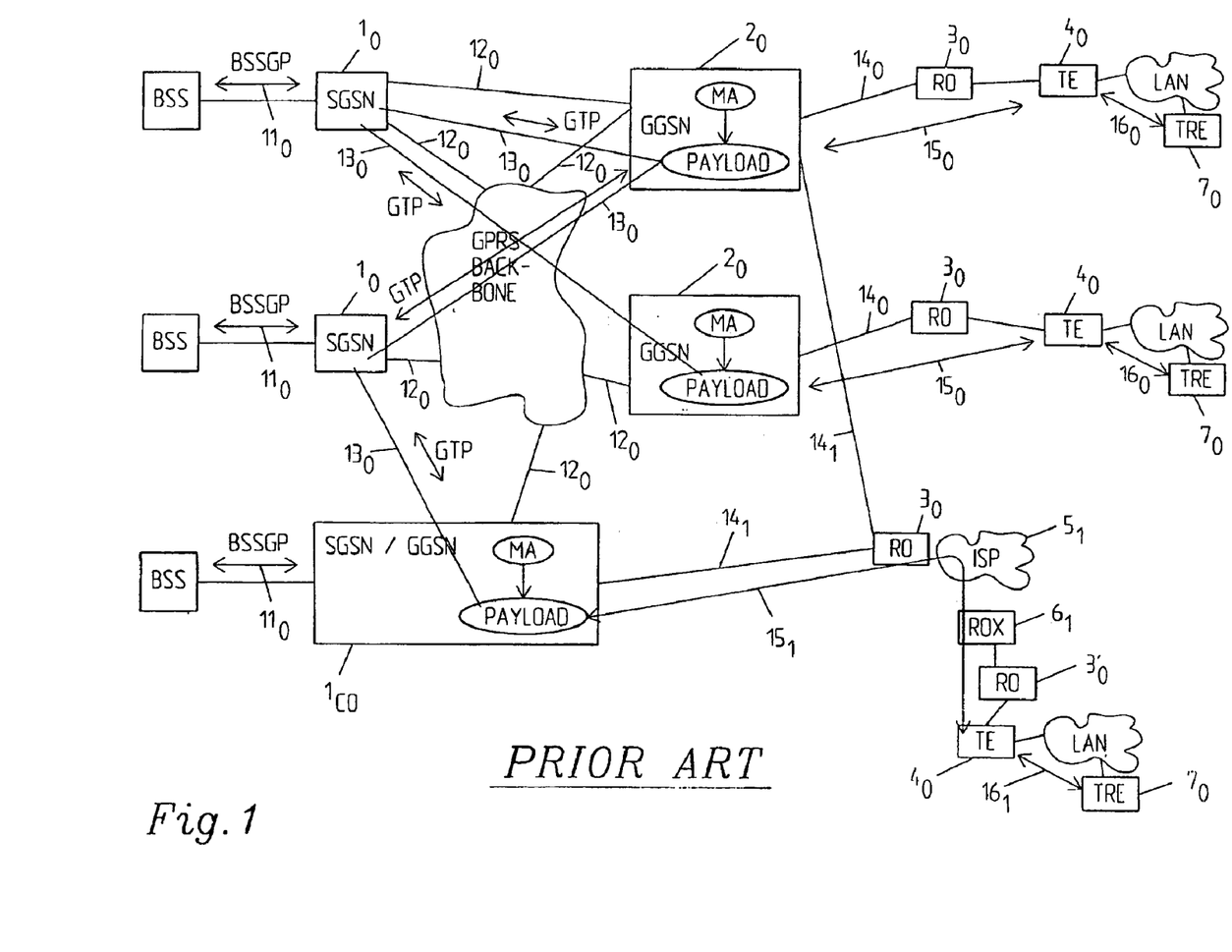
FIG. 1 shows a prior art network structure which is illustrated for explanatory reasons.

For explanatory reasons and in order to explain the functioning and the advantages of the inventive arrangement a prior art network structure which relates to GPRS is illustrated in FIG. 1. Two SGSNs $1_0$ are connected to base station subsystems, BSS. In the figure also a combined SGSN/GGSN, i.e. a node which includes both the functionality of a SGSN and the functionality of a GGSN $1_{co}$ is illustrated. The SGSNs $1_0$ communicate with GGSNs $2_0$, $2_0$ via physical links $12_0$ which run via the GPRS backbone. There is also a physical link $12_0$ to the combined SGSN/GGSN via the GPRS backbone. The GGSN nodes $2_0$, $2_0$ and the combined SGSN/GGSN include the management functionality MA for the payload traffic. To provide for communication or connection with an end user LAN or a traffic end point, which is the end user equipment that communicates with the mobile station, (not shown) routing devices RO $3_0$ are supplied either by the end user or the by the GPRS operator, which generally is the case. There is a link $14_0$ to the end user from the GPRS system. On this link a tunnel protocol has to be run in order to enable the use of end user private IP addressing towards the mobile station (not shown). The tunnel or the tunnel protocol $15_0$ runs from a GGSN $2_0$ to a tunnel device or a tunnel end point TE $4_0$ which has to be reachable through the use of public IP addressing or by use of GPRS operator supplied addressing. Otherwise the TE $4_0$ can not be reached from the GGSN $2_0$. It can be routed through Internet. Then however encryption may be required. The tunnel end point TE $4_0$ is, as referred to above, the end point of the tunnel $15_0$ and it is an end user (or GPRS operator) supplied device that uses an unspecified tunnel protocol $16_0$ (possible with encryption), which is managed by the end user. The traffic end point TRE $7_0$ is, as referred to above, the end user equipment communicating with the mobile station. Links $14_1$ are provided from the GGSN $2_0$ and the combined SGSN/GGSN $1_{co}$ from GPRS to an Internet Service Provider ISP $5_1$ for Internet access. A routing device ROX $6_1$ is provided and it is used from Internet towards the end user. $16_1$ indicates the link from the end user to Internet over a routing device $3_0'$. $13_0$ illustrates the GTP link used from SGSN to GGSN. Thus, for the known solution routing devices are required meaning that the operator has to provide for a GGSN and a router and it also presupposes a tunnel end point.

Figure 2:
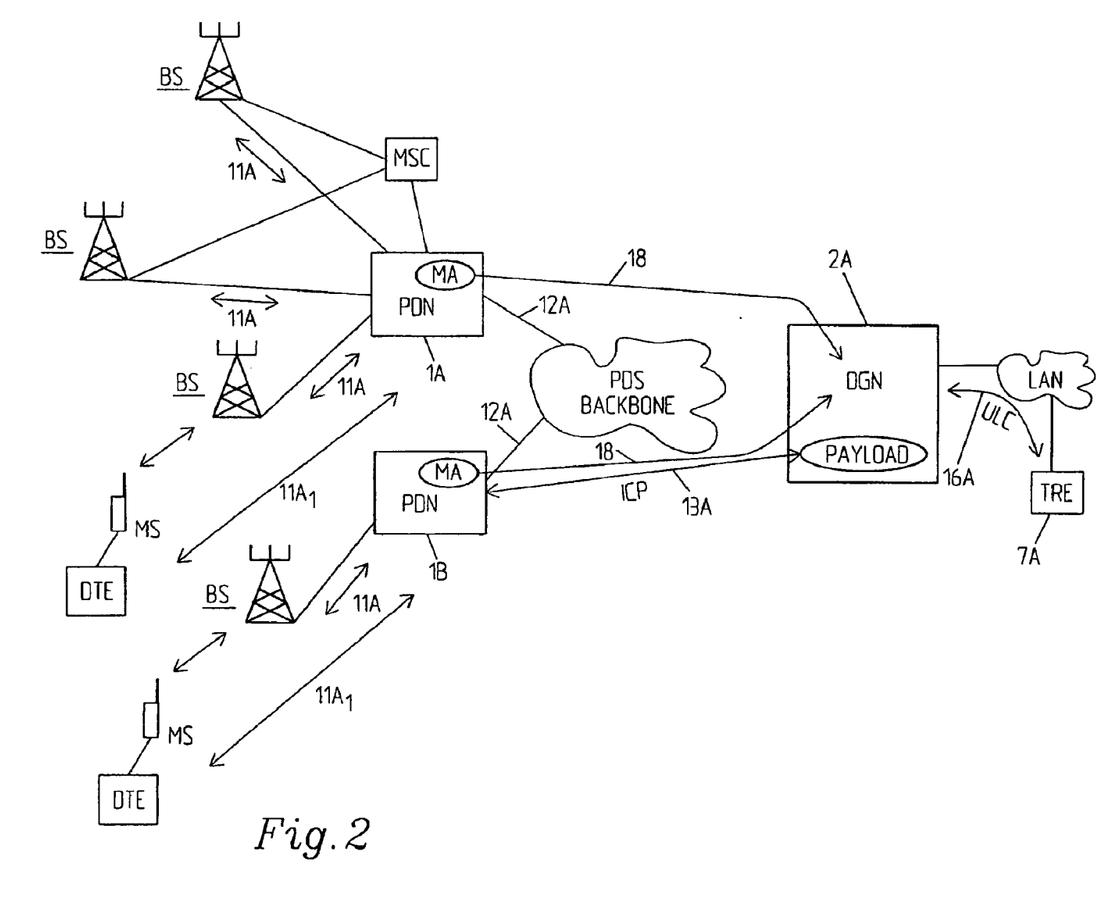
FIG. 2 shows an example of an implementation of the present invention to a packet data system.

FIG. 2 shows the implementation of the inventive concept to a packet data system PDS in general, as long as it includes serving and gateway node functionality.

The inventive concept in general terms consists in the introduction of a virtual gateway packet data node which is built in a distributed way and which comprises a DGN (an interworking node device) 2A and a management system MA executing in a packet data node 1A, 1B. FIG. 2 shows two packet data nodes PDN 1A, 1B communicating with base stations BS using a communication protocol 11A. Since the communication system in this case also supports communication of speech and circuit switched data, it comprises a number of mobile switching centers MSC in a conventional manner and of which only one is illustrated. According to different embodiments payload and management come from different notes, or from the same, the management may be implemented in a number of nodes to provide for redundancy, various alternatives being possible. The DGN may also be network connected.

In FIG. 2 a mobile station MS is illustrated which is connected to a digital terminal equipment DTE. MS communicates via radio link with a BS. A communication protocol $11A_1$ is also illustrated for communication between PDN 1A, 1B and an MS respectively. Information of mobile subscriber stations is kept in the respective PDN 1A; 1B which also provides for multiplexing, compression, access control etc. and the communication protocol 11A, is virtual and "holds" packets together sent to/from the same destination. The interworking node device DGN 2A is capable of receiving internal communication protocol (ICP) frames and it includes converting means for converting said ICP frames sent over the ICP link 13A. There are also physical links 12A from PDN 1A, 1B via the PDS backbone to the DGN 2A. The management system MA executing in. PDN 1A, 1B manage DGN 2A via 18 and as can be seen, in this embodiment one and the same DGN 2A can be managed both by PDN 1A and PDN 1B for redundancy reasons. In DGN 2A the ICP frames are converted to user level frames of a user level protocol ULC communicating over link 16A with the traffic end point (TRE) 7A. Thus, in the converting means in DGN 2A the conversion is performed between ICP frames and ULC frames and the ULC frames are passed on and off the users LAN to the traffic end point TRE 7A. Advantageously DGN 2A is managed by the packet data communication operator. Thus, as can be seen from the figure, the internal communication protocol ICP can be used on the way to the DGN 2A which is, advantageously, provided by, and located with, the customer, thus requiring no routing device and extra tunnelling. If the ICP frames are encrypted, for example so called IP-sec-frames, DGN is also able to handle them. Encryption is however optional and depends on the particular implementation, whether Internet is an interconnect or not etc.

Figure 3:
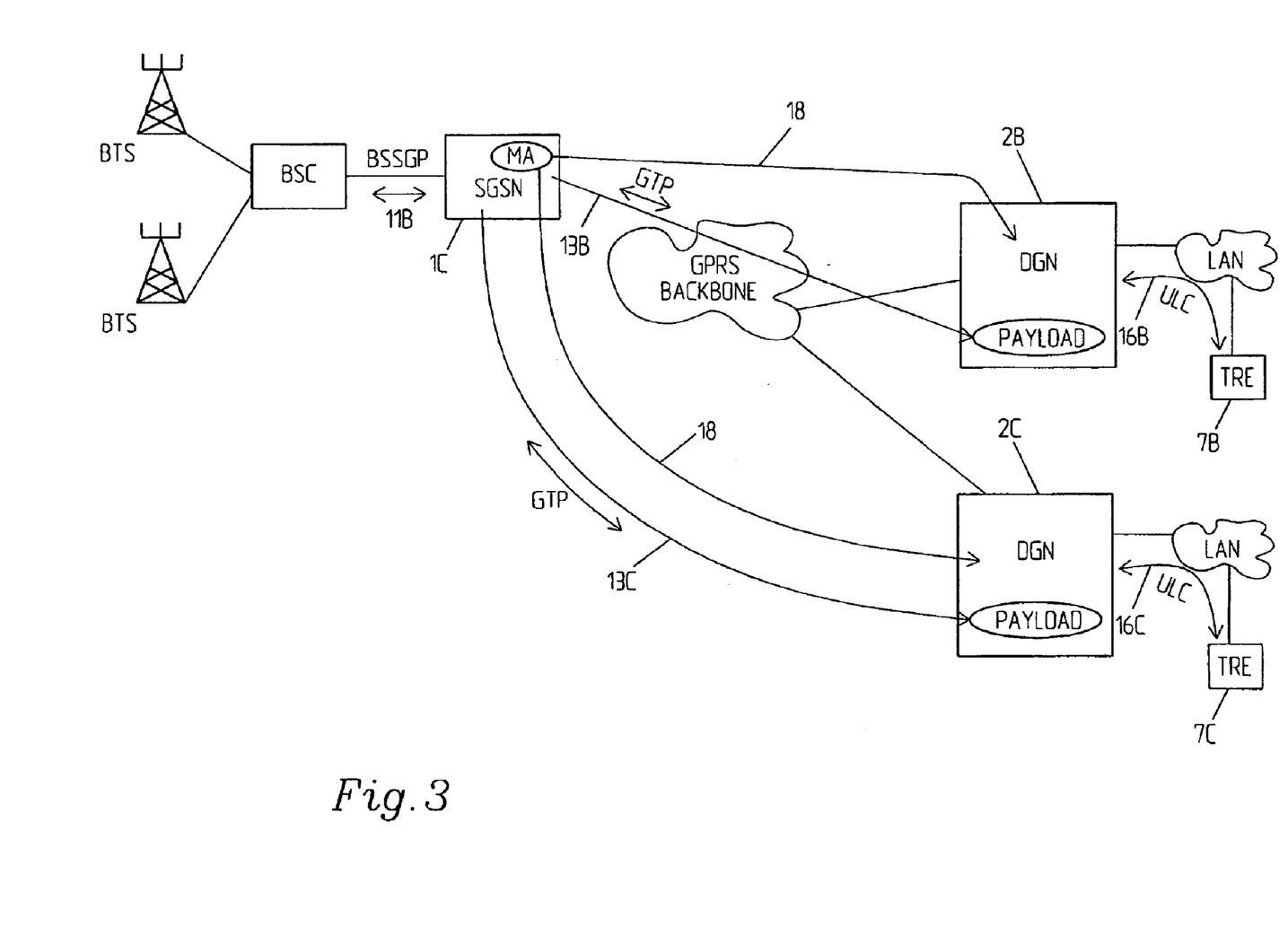
FIG. 3 is a figure similar to FIG. 2 schematically illustrating an implementation to GPRS.

FIG. 3 shows an embodiment of the invention as implemented to GPRS. A packet data node here comprises a serving GPRS support node SGSN communicating with the base station controller BSC which in turn communicates with a number of base transceiver stations BTS. The SGSN 1C communicates with the BSC via a communication protocol 11B which here for example is the BSS GPRS protocol BSSGP. The SGSN is at the same hierarchical level as an MSC (no MSC is illustrated in this figure) and it keeps track of the locations of individual MSs, performs security functions and access control. The SGSN 1C is connected to BSS with frame relay. SGSN 1C is connected to DGN 2B via the GPRS backbone network and an internal communication protocol 13B; 13C is used for communication between SGSN 1C and DGN 2B, 2C respectively. The internal communication protocol is here advantageously the GTP protocol. The GTP protocol is described in GSM 09.60, version 5.0.0, draft TS 100,960 V 5.0.0 (1998–01) by ETSI, (European Telecommunication Standards Institute) which herewith is incorporated herein by reference. The general packet radio service GPRS is further described in GSM 03.60, version 5.2.0 (1997–12), by ETSI, and it is also incorporated herein by reference. The DGNs 2B; 2C are managed by the management functionality executing in SGSN 1C via communication links 18. It does not have to be separate physical links for the management and the payload traffic as illustrated in the figure (cf. e.g. 13C and 18) but one and the same physical interface may be used. This is also applicable for FIG. 2 and FIG. 4. In this embodiment is illustrated in a simplified manner that two DGNs (or more of course) are managed by one and the same SGSN. However, this does not have to be the case, but it shows an advantageous implementation. Also more than two DGNs may be managed by one and the same SGSN etc. just as one or more of the DGNs may be managed from two or more SGSNs for redundancy reasons. In DGN 2B; 2C a conversion is performed between GTP frames and user level frames of the user level communication protocol ULC 16B to the traffic end points TRE 7B; 7C of the end user LANs. Thus, in a particular embodiment DGN 2B; 2C is capable of receiving GTP frames, which may be encrypted or not, and if encrypted, probably so called IP-sec frames, and of converting the GTP frames to for example IP frames and passing the IP frames on and off the end users LAN. Advantageously DGN 2B; 2C is managed by the operator of GPRS.

FIG. 4 again shows an implementation to GPRS. SGSNs 1D, 1E, 1F are connected to BSS in a conventional manner. SGSN 1D, 1E, 1F all include the execution of a management functionality which forms a part of a virtual GGSN which also comprises DGNs 2D, 2E and 2F respectively. The management of DGNs 2D, 2E and 2F respectively is handled via links 18 as more thoroughly described with reference to FIG. 3. Again the GTP protocol is used as an internal communication protocol 13C, 13D, 13E which is used for the payload traffic. As described above, in DGN 2D and 2E respectively a conversion is done to/from the user level communication protocol ULC 16D, 16E to the traffic end point TRE of the end user LAN.

Figure 4:
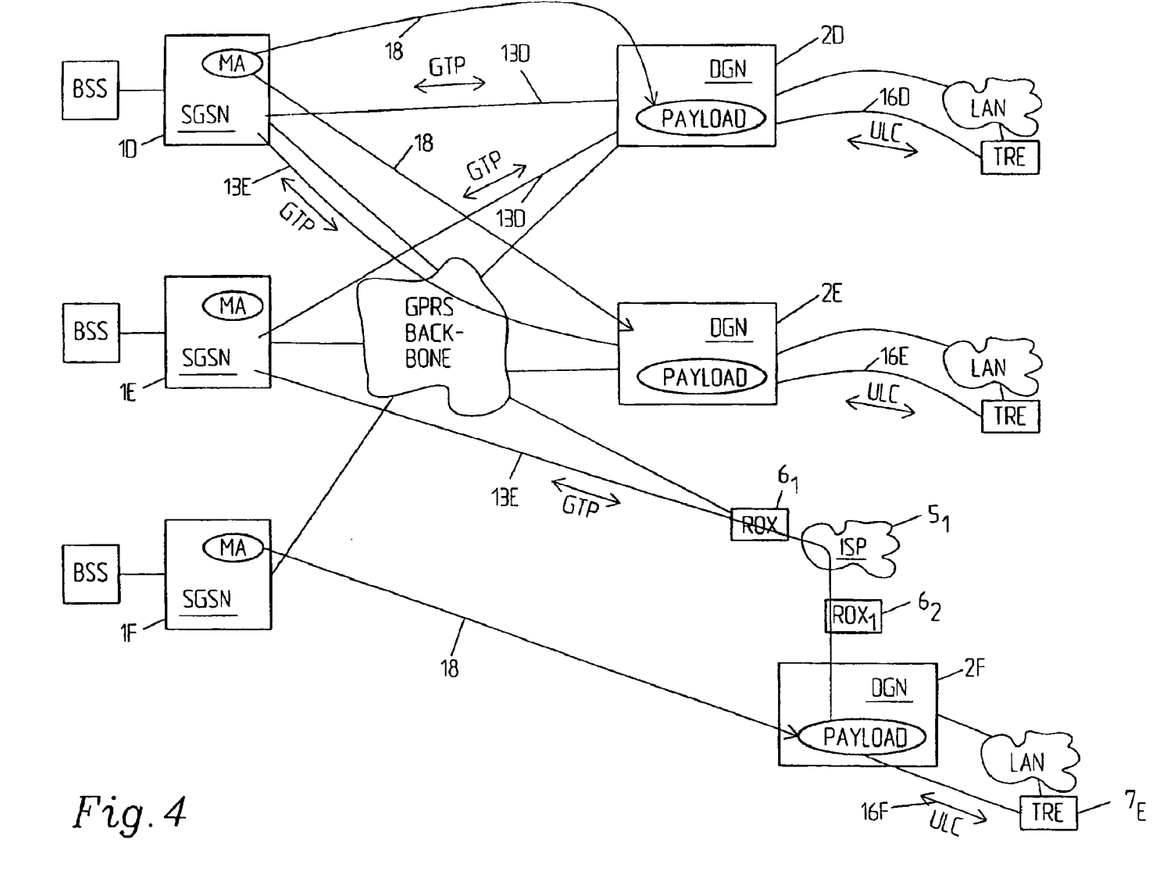
FIG. 4 shows a particular embodiment of an implementation of the invention to GPRS.

However, in this case a router ROX $6_1$, which may be supplied either by the end user or by the GPRS operator and which is the router used to Internet Service Provider ISP $5_1$ which communicates with a router ROX$_1$ $6_2$ which is a router used from Internet towards the end user communicating with the DGN 2F, which in turn provides for conversion between the internal communication protocol GTP 13E and the user level communication protocol 16F from DGN 2F to traffic end point TRE 7E. As can be seen, the end point of the GTP tunnel goes all the way to the DGN 2D, 2E and 2F respectively in each case wherein the conversion takes place and as can be seen no GGSN is required as well as no routing devices are required to be provided by the operator and still further no extra tunnelling is needed to the end user LAN. Since the DGNs are provided by the end user they are particularly adapted to the specific needs and requirements of the end user. This also assists in making the solution decentralised and, in comparison with hitherto known structures, insensitive to faults in that the consequences thereof will be much less serious.

The invention is of course not limited to the explicitly illustrated embodiments, but it can be varied in a number of ways within the scope of the claims.

What is claimed is:

1. An arrangement for interconnecting an end user local network and a General Packet Radio Service (GPRS) network, comprising
   a packet data network backbone,
   at least one Serving GPRS Support Node (SGSN) with a serving functionality for handling packet data communication, and
   at least one distributed gateway node (DGN) providing a gateway functionality between said end user local network and said GPRS network and comprising an interworking means for converting between a local network end user communication protocol using a user level data packet format and an internal packet data communication protocol using an internal packet data format, wherein a management functionality for managing the distributed gateway node resides within said SGSN and wherein said SGSN communicates signaling over said packet data network backbone to manage said distributed gateway node.

2. An arrangement according to claim 1, wherein said arrangement comprises a plurality of SGSN and the management functionality is provided and executed in a number of said SGSN.

3. An arrangement according to claim 1, wherein the internal packet data frames of the internal communication protocol are encrypted, and the interworking means converts said internal packet data frames to/from user level packet data frames.

4. An arrangement according to claim 3, wherein the encrypted frames are IP-sec-frames.

5. An arrangement according to claim 3, wherein at least a number of end user(s) use(s) an overlapping IP-addressing scheme, the external data network being the Internet.

6. A General Packet Radio Service (GPRS) communication system supporting packet data communication and connected to an external data network and comprising     a number of Serving GPRS Support Nodes (SGSN) with a serving functionality for handling packet data communication and communicating with a base station system and with end user local network,     a gateway functionality node connected to said packet data communications for communicating with the external data network(s), further comprising converting means for converting between a communication protocol for local network end user traffic which protocol comprises a user level data packet format (ULC) and an internal packet data network protocol using an internal packet data format (ICP)

packet data backbone for connecting said SSSNs and said gateway functionality node; and     wherein management functionality for managing said gateway functionality node is located within one of said SGSNs and manages said gateway functionality node via signaling over said packet data backbone.

7. A GPRS communication system according to claim 6, wherein a number of internal packet data frames provided to a number of interworking node devices for conversion, are encrypted, and interworking nodes device(s) convert, said internal packet data frames to/from user level packet data frames.

8. A method of interconnecting an end user local network and a General Packet Radio Service (GPRS) network comprising a packet data network backbone and a number of Serving GPRS Support Nodes (SGSNs) including a serving functionality for handling packet data communication and a gateway functionality for communication with external networks, comprising the steps of:

introducing an interworking node device providing a gateway functionality,     executing the management of said interworking nodes device within one of said SGSNs including a serving functionality,     using an internal data communication protocol for communication between said one of said SGSNs and said interworking node device and wherein said one of said SGSNs manages said interworking node device using said internal data communication protocol,     using an end user communication protocol for communication between said interworking node device and an end user of a local network, and     in said interworking node device, converting between the end user communication protocol and the internal data communication protocol.

* * * * *

UNITED STATES PATENT AND TRADEMARK OFFICE
CERTIFICATE OF CORRECTION

PATENT NO. : 6,735,187 B1 Page 1 of 1
APPLICATION NO. : 09/502756
DATED : May 11, 2004
INVENTOR(S) : Helander et al.

It is certified that error appears in the above-identified patent and that said Letters Patent is hereby corrected as shown below:

In Column 7, Line 1, delete "11A," and insert -- $11A_1$ --, therefor.

In Column 7, Line 8, delete "in." and insert -- in --, therefor.

In Column 9, Line 14, in Claim 6, delete "(SGSN)" and insert -- (SGSNs) --, therefor.

In Column 9, Line 26, in Claim 6, delete "(ICP)" and insert -- (ICP), --, therefor.

In Column 9, Line 27, in Claim 6, delete "SSSNs" and insert -- SGSNs --, therefor.

In Column 10, Line 4, in Claim 7, delete "convert," and insert -- convert --, therefor.

Signed and Sealed this

Third Day of June, 2008

JON W. DUDAS
*Director of the United States Patent and Trademark Office*